United States Patent [19]
Bonnelie

[11] Patent Number: 5,570,573
[45] Date of Patent: Nov. 5, 1996

[54] COMBUSTION CHAMBER FOR A THRUSTER WITH A SEALED CONNECTION BETWEEN AN END WALL AND A COMPOSITE TUBULAR STRUCTURE

[75] Inventor: Guy Bonnelie, Le Bouscat, France

[73] Assignee: Societe Europeene de Propulsion, Suresnes, France

[21] Appl. No.: 498,594

[22] Filed: Jul. 6, 1995

[30] Foreign Application Priority Data

Jul. 8, 1994 [FR] France ................................. 94 08460

[51] Int. Cl.⁶ .................................................... F02K 9/00
[52] U.S. Cl. .......................... 60/253; 60/39.32; 285/404
[58] Field of Search ......................... 60/252, 253, 39.32; 285/404

[56] References Cited

U.S. PATENT DOCUMENTS

| | | | |
|---|---|---|---|
| 2,761,279 | 9/1956 | Smith | 60/35.6 |
| 4,484,439 | 11/1984 | Singer et al. | 60/230 |
| 4,766,726 | 8/1988 | Tackett et al. | 60/255 |
| 4,829,765 | 5/1989 | Bolieau et al. | 60/255 |
| 4,865,356 | 9/1989 | Moore et al. | 285/404 |
| 5,044,154 | 9/1991 | English, Jr. et al. | 60/223 |
| 5,070,691 | 12/1991 | Smith et al. | 60/253 |

FOREIGN PATENT DOCUMENTS 1179966  2/1970  United Kingdom.

OTHER PUBLICATIONS

"Thiokol Begins Full–Diameter Tests of Redesigned SRB Field Joint", Michael Dornheim Aviation Week and Space Technology, 9, Feb. 1987, New York, U.S.A. pp. 119–123.

*Primary Examiner*—Charles G. Freay
*Attorney, Agent, or Firm*—Weingarten, Schurgin, Gagnebin & Hayes

[57] ABSTRACT

The combustion chamber of the thruster comprises a tubular structure of composite material, at least one end wall applied to an end of the tubular structure, and a sealed connection device between the tubular structure and the end wall. The connection device includes mechanical connection means comprising smooth-walled studs engaged through the tubular structure and the end wall so as to provide connection in an axial direction and in its circumferential direction, together with stud retaining means operating in a radial direction. A sealing gasket is interposed between the end wall and an annular intermediate part forming a gasket bearing member secured to the end wall in the radial direction in such a manner as to keep the gasket compressed in the event of the end wall deforming.

9 Claims, 3 Drawing Sheets

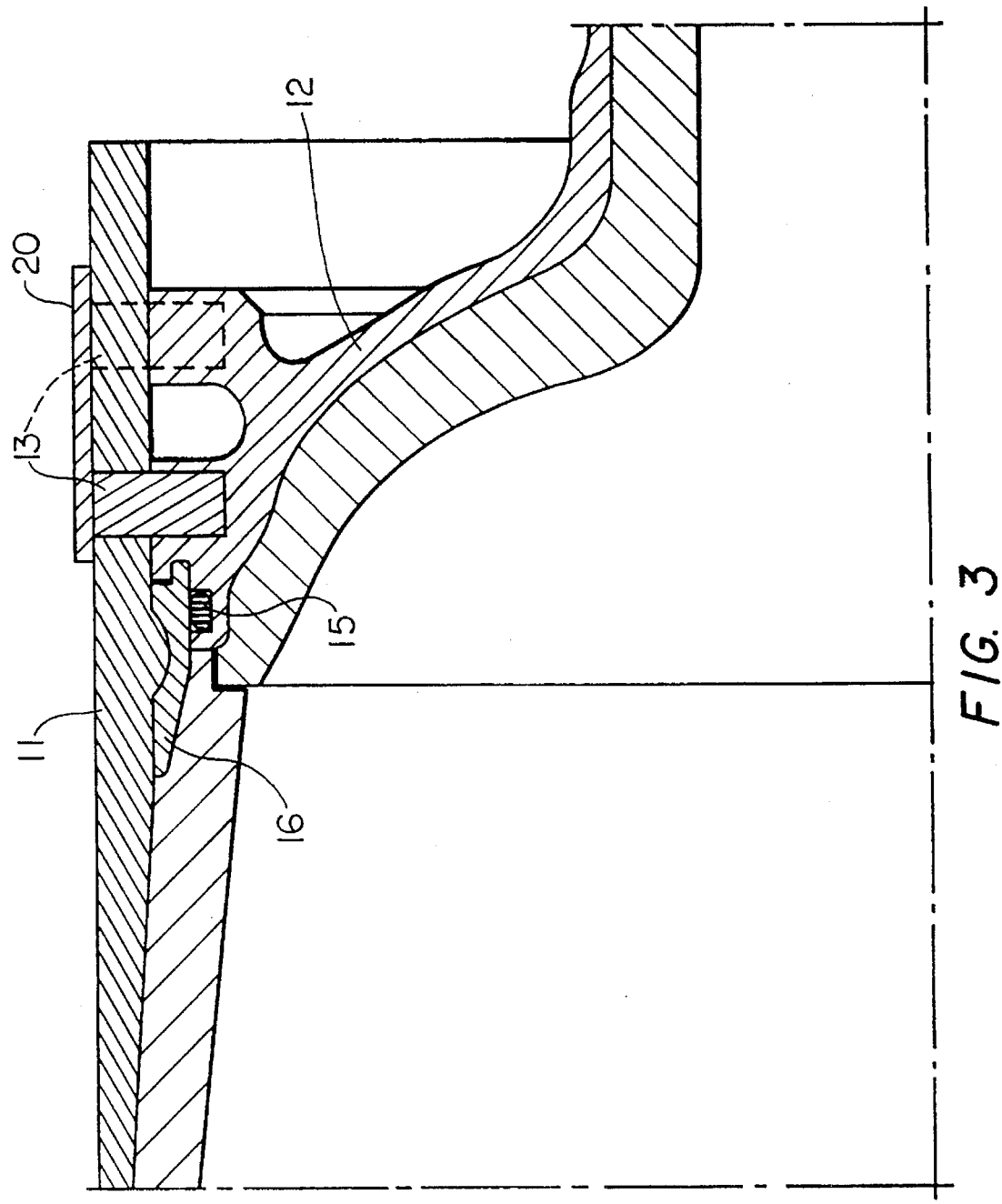

COMBUSTION CHAMBER FOR A THRUSTER WITH A SEALED CONNECTION BETWEEN AN END WALL AND A COMPOSITE TUBULAR STRUCTURE

The present invention relates to a combustion chamber for a thruster, the chamber comprising a tubular structure of composite material and at least one end wall attached to one end of the tubular structure. More particularly, the invention relates to a sealed connection device between the tubular structure and the end wall.

BACKGROUND OF THE INVENTION

A technique that is well known for making a thruster combustion chamber consists in separately making a tubular structure or shell constituting a thruster body and end walls which are attached to the ends of the tubular structure. One of the end walls, the rear end wall, leaves a passage for combustion gases leading to a nozzle. The tubular structure is commonly made of composite material, using a filament-winding technique, with the tubular structure being required to withstand the high pressures that are generated in the combustion chamber. The end walls may likewise be made of composite material, but they also be made of metal, e.g. titanium. The connection between the tubular structure and an end wall includes mechanical connection means suitable for withstanding the pressures generated in the chamber and at least one sealing gasket that prevents any gas from flowing between the tubular structure and the end wall.

A known device for providing a sealed connection between the tubular structure and the rear end wall of the combustion chamber of a thruster is shown diagrammatically in FIG. 1. The tubular structure 1 of composite material and the metal rear end wall 2 are assembled together by means of screws 3. The end wall 2 has a ring-shaped peripheral portion 2a engaged inside the tubular structure and receiving the screws 3 that pass through the tubular structure. The screws 3 are disposed in one or more circumferential rows. An O-ring or toroidal gasket 5 is compressed between the portion 2a of the end wall and an annular gasket bearing member 6 constituted by metal coating over a portion of the inside surface of the tubular structure 1. The tubular structure 1 and the end wall 2 are provided with respective internal thermal protection coatings 7 and 8. Thermal protection coating 7 is made of rubber and is adhered to the inside faces of the tubular structure and the gasket bearing member 6.

This known solution suffers from several drawbacks. It is necessary to tighten hard screws 3 in the circumferential row closest to the gasket 6 in order to ensure that the gasket is sufficiently compressed even in the event of the end wall deforming, e.g. under the effect of high internal pressure inside the chamber. In addition, the screws suffer shear, bending, and lateral hammering stresses. The internal pressure inside the chamber gives rise to very large axial forces on the end wall and to correspondingly large transverse forces across the screw threads. However, lateral hammering stresses on the screw threads along a transversal axis must be avoided, and are in fact ruled out by U.S. aviation standard MIL STD 1515A.

In document U.S. Pat. No. 4,766,726, a combustion chamber of a solid fuel thruster is made up of two portions, a front portion and a rear portion, which are assembled by means of an annular coupling element. The connection between the coupling element and each of the tubular structures of the front and rear portions of the chamber is provided by means of smooth-walled radial studs and wedges which, on screwing, exert shear forces on the studs. As a result, the studs restrain not only axially but also radially so as to maintain the compressed state of a sealing O-ring placed between each of the tubular structures and the coupling element. The fixing elements are thus not screws, but smooth studs that are subjected to shear stresses. Nevertheless, a drawback of that solution lies in that the shear force exerted on the studs must be very high in order to avoid any relative radial displacement between the assembled parts and a consequent sealing loss through a release of compression on the O-ring gasket, particularly in the event of thermally-induced dimensional variations. A construction similar to that of patent U.S. Pat. No. 4,766,726 is described in the publication AVIATION WEEK AND SPACE TECHNOLOGY, 9, Feb. 1989, NEW YORK US, pages 119–123, DORNHEIM 'Thiokol begins full-diameter tests of redesigned SRB field joint'.

OBJECTS AND SUMMARY OF THE INVENTION

An object of the present invention is to provide a connection device which provides a mechanical connection and seal that are satisfactory while avoiding the above-mentioned drawbacks.

According to the invention, this object is achieved by the fact that the mechanical connection means between the tubular structure and the end wall are in the form of smooth-walled studs engaged through the tubular structure and the end wall so as to provide connection along the axial direction and along the circumferential direction without securing the tubular structure to the end wall in the radial direction, and means for retaining the studs in the radial direction, and that a sealing gasket is compressed between the end wall and an annular intermediate part forming a gasket bearing member secured to the end wall in the radial direction.

Thus, axial forces between the end wall and the tubular structure are transmitted by smooth-walled studs and not by screws. The studs are not required to exert a joining action radially between the tubular structures and the end wall. There is therefore no need to stress them in shear. The studs may be held radially by means of screws that pass through the studs with some clearance and screw into the end wall from the outside of the tubular structure. The clearance between the screws and the studs ensures that the screw threads are not subjected to lateral hammering. In addition, the use of screws as stud-retaining means facilitates disassembly and reassembly. Other radial retaining means for the studs could be used, e.g. a hoop surrounding the tubular structure level with the studs. The hoop may be dismountable or non-dismountable. It could be made, for example, by an overwinding on the tubular structure.

According to another characteristic of the sealed connection device, the gasket bearing member and the end wall between which the gasket is compressed are held together in the radial direction. As a result, the gasket bearing member tracks any radial deformation that may occur in the end wall, and as a result gasket compression and thus sealing efficiency are not affected thereby.

The radial connection between the gasket bearing member and the end wall may be provided by a projecting portion or rim integral with the gasket bearing member and engaged in a corresponding annular recess in the end wall.

Advantageously, but not necessarily, the gasket bearing member and the end wall are made of the same material, e.g. a metal, such as titanium.

The tubular structure is provided with internal thermal protection means. Advantageously, this means is bonded both to the inside wall of the tubular structure and to the gasket bearing member so that sealing is achieved between the gasket bearing member and the tubular structure.

The end wall is also provided with internal protection. This is coupled with the internal protection of the tubular structure, preferably by forming a baffle so as to impose a sinuous path on any gas that may infiltrate between the two thermal protections up to the gasket.

BRIEF DESCRIPTION OF THE DRAWINGS

The invention will be better understood on reading the following description given by way of non-limiting indication, and made with reference to the accompanying drawings, in which:

FIG. 3 is a fragmentary view in section showing a variant embodiment of the connection shown in Figure 2.

MORE DETAILED DESCRIPTION

Although the following description relates solely to a sealed connection between a tubular structure or shell of a combustion chamber and a rear end wall thereof, it will be understood that a similar sealed connection could be implemented between the tubular structure and a front end wall.

Figure 1:
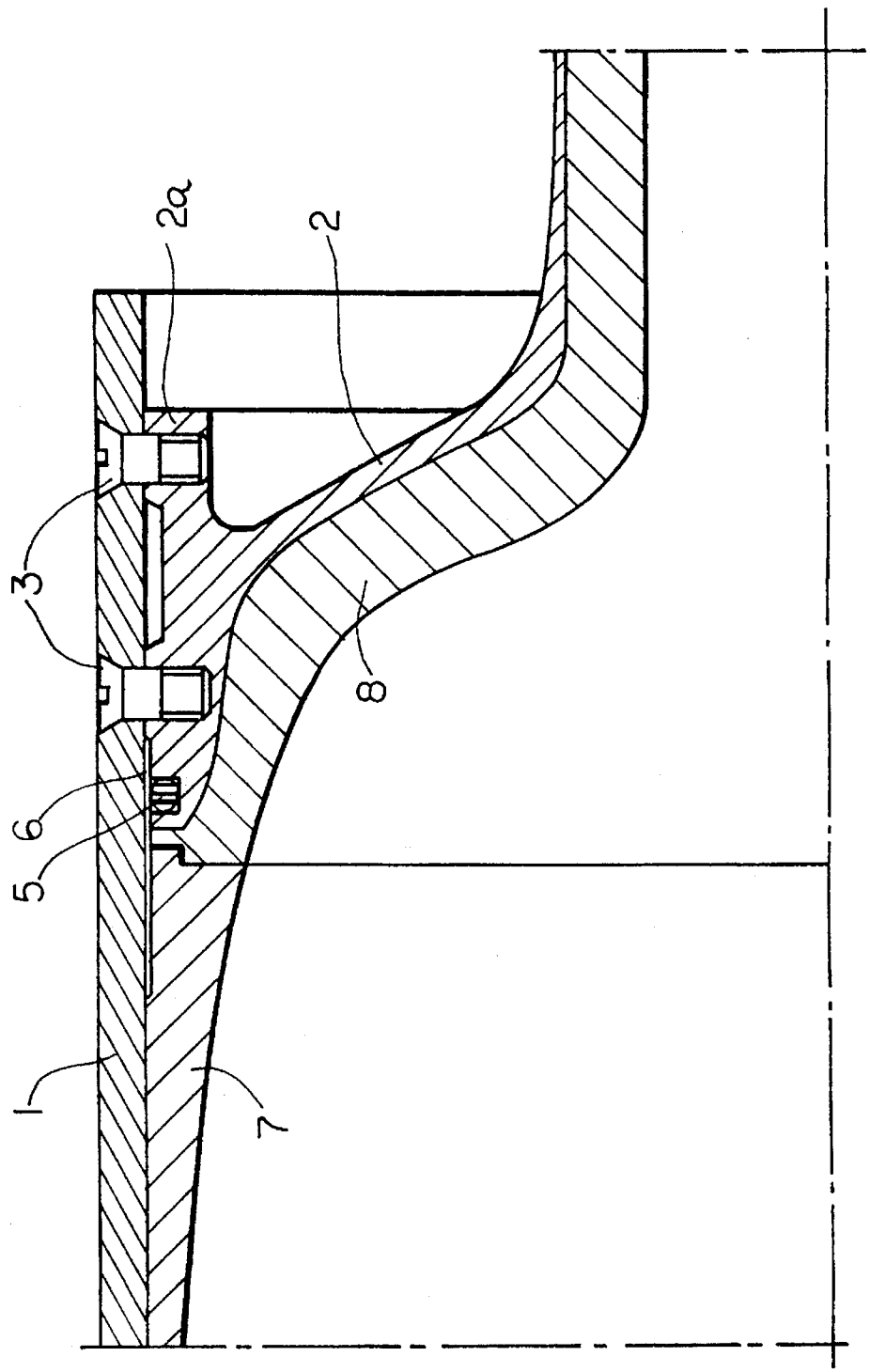
FIG. 1, as described above, is a fragmentary section view showing the connection between the tubular structure and the rear end wall of a prior art combustion chamber.
Figure 2:
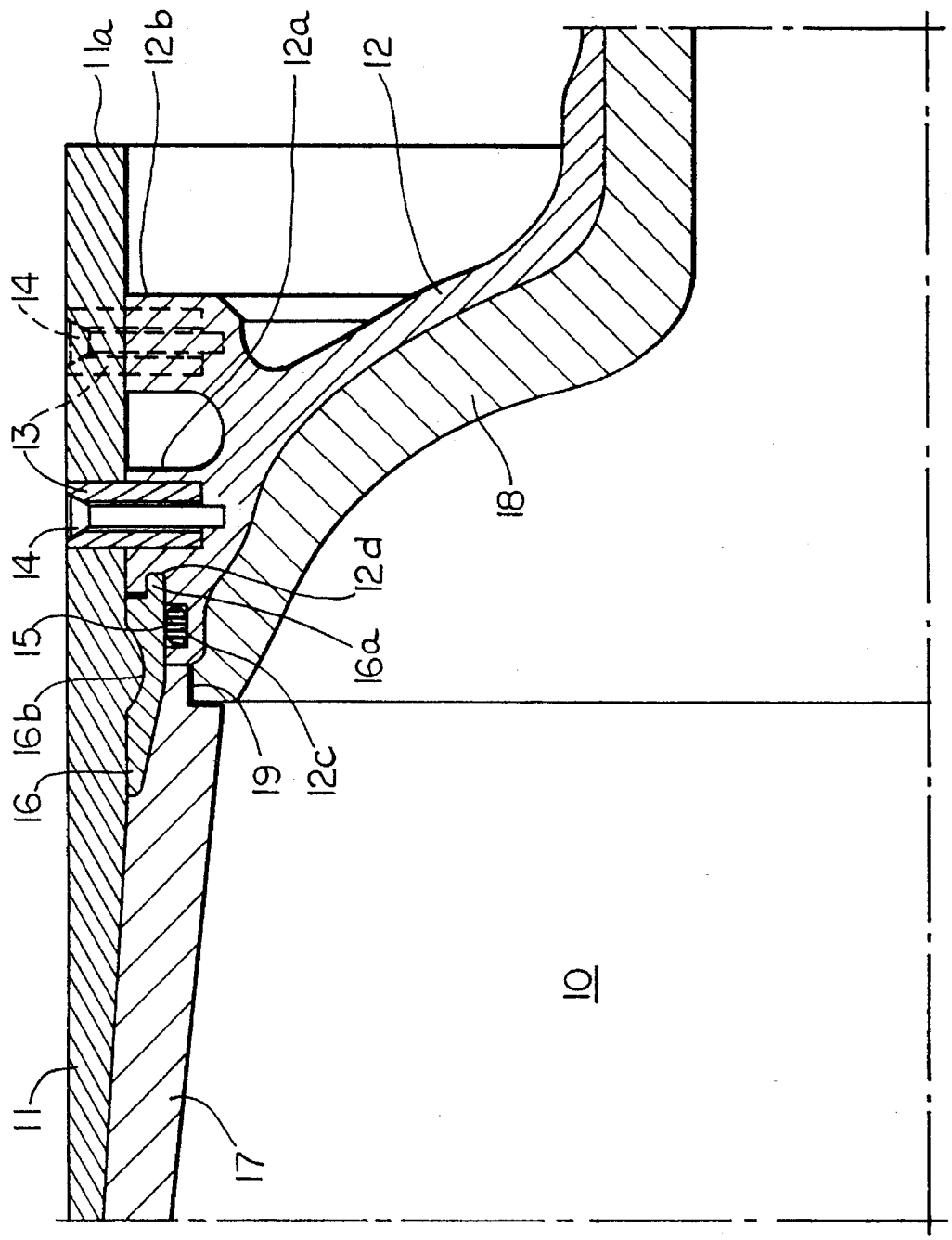
FIG. 2 is a fragmentary view in section showing the connection between the tubular structure and the rear end wall of a combustion chamber constituting an embodiment of the present invention.

The combustion chamber shown diagrammatically in FIG. 2 comprises a shell or tubular structure 11 that forms the body of the thruster and that surrounds the chamber 10 proper. The tubular structure 11 is made of a composite material by winding filaments. This technique, which consists in winding a filament impregnated with a resin that is subsequently polymerized, is well known.

At its rear end, the tubular structure 11 is closed by an end wall 12, e.g. made of titanium. The end wall 12 has an axial passage for combustion gases, a dome-shaped central portion, and one or more peripheral rings 12a, 12b. The rings 12a, 12b have the same outside diameter, which is substantially equal to the inside diameter of the rear portion of the tubular structure 11 in which the end wall 12 is engaged. The rear end 11a of the tubular structure 11 beyond the end wall 12 forms an annular skirt.

The axial and circumferential mechanical connection between the tubular structure and the end wall 12 is provided by smooth-walled cylindrical studs 13. Each stud extends substantially radially through a through hole formed in the tubular structure 11 and into a blind hole formed in the periphery of the end wall 12. One or more circumferential rows of studs 13 are provided, each row being located level with one of the rings 12a, 12b of the end wall 12. The number of rows of studs 13 is selected as a function of the forces—mainly axial—exerted on the mechanical connection. The studs 13 are retained in their housings by screws 14 that pass through the studs and into the end wall 12. The screws 14 are accessible from the outside and therefore make it easy to assemble, disassemble, and reassemble the end wall 12. The studs 13 do not impede relative radial displacement between the tubular structure and the end wall.

Sealing between the end wall 12 and the tubular structure 11 is provided by means of a toroidal sealing gasket 15. The gasket 15 is received in an annular groove 12c formed in the front portion of the end wall 12, and it bears against the inside face of a gasket bearing member 16. This member is constituted by a ring-shaped part interposed between the end wall 12 and the tubular structure 11, and preferably made of the same material as the end wall 12, i.e. titanium in the present example.

At the rear end, the gasket bearing member 16 is extended by an annular projection or rim 16a which forms an integral portion of the gasket bearing member and which engages in a corresponding recess 12d formed in the facing portion of the end wall 12. As a result, the gasket bearing member 16 is radially engaged with the end wall 12, thereby guaranteeing that the gasket 15 is maintained in the compressed state even in the event of radial deformation of the end wall 12 under the effect of the pressure existing in the combustion chamber 10. The end wall 12 and the gasket bearing member 16 are made of materials that have substantially the same coefficient of thermal expansion, e.g. they are made of the same material, thereby obtaining the particular advantage of avoiding any differential variation in dimensions under the effect of heating. The gasket bearing member 16 is held axially in the tubular structure 11. In the example shown, this is achieved by forming an annular groove 16b in the outside face of the gasket bearing member 16 serving to receive an internal rib of corresponding shape on the tubular portion 11. In practice, the annular structure 11 may be wound onto the gasket bearing member 16.

The inside faces of the tubular structure 11 and of the end wall 12 are provided with respective thermal protection coatings 17 and 18 in conventional manner. The thermal protection coating 17 is made of rubber and also covers the front portion of the inside surface of the gasket bearing member 16. Still in a known manner, the bonding between the thermal protection coating 17 and the tubular structure 11 or the gasket bearing member 16 is provided by an adhesive or is obtained during vulcanization of the rubber. Similarly, the thermal protection coating 18 is bonded to the inside surface of the end wall 12.

The bonding between the thermal protection coating 17 and the gasket bearing member 16 provides a seal between the gasket bearing member 16 and the tubular structure 11. It may also be observed that the adjacent ends of the thermal protection coatings 17 and 18 define a baffle 19 which imposes a sinuous path on combustion gases generated inside the chamber 10 and penetrating towards the sealing gasket 15, thereby protecting the gasket from a direct effect of the gases.

FIG. 3 shows a variant embodiment of the connection shown in FIG. 2. The only difference lies in the radial retaining means for the studs 13. Instead of screws, a hoop 20 is used which surrounds a portion of the tubular structure 11 at least where the studs 13 are located. The hoop, for example, is made by a winding formed around the tubular structure after the studs have been put into place. Such overwinding can be performed in the same manner as the filament winding from which the composite structure 11 is built up, in which case the hoop is not dismountable. In a variant, the hoop 20 may be made by winding a filament or a strip, or by banding, using mechanical locking means that enable the hoop to be dismounted and remounted.

I claim:

1. A thruster combustion chamber comprising a tubular structure of composite material, at least one end wall attached to one end of the tubular structure, and a sealed connection device between the tubular structure and the end wall, the connection device including mechanical connection means between the tubular structure and the end wall, and at least one sealing gasket interposed between the tubular structure and the end wall, wherein the mechanical connection means comprise smooth-walled studs engaged through the tubular structure and the end wall so as to provide connection in an axial direction and in a circumferential direction while not securing the tubular structure to the end wall in a radial direction, and stud-retaining means for retaining the studs in a radial direction;

and wherein a sealing gasket is compressed between the end wall and an annular intermediate part forming a gasket bearing member secured to the end wall in the radial direction, thereby enabling the gasket bearing member to follow any deformation of the end wall in the radial direction and maintaining the gasket in the compressed state.

2. A combustion chamber according to claim 1, wherein the gasket bearing member is secured to the tubular structure in the axial direction.

3. A combustion chamber according to claim 1, including an internal thermal protection coating which is bonded both to the tubular structure and to the gasket bearing member.

4. A combustion chamber according to claim 1, wherein the gasket bearing member includes an annular projection or rim engaged in a corresponding annular recess of the end wall in such a manner as to secure the gasket bearing member and the end wall in the radial direction.

5. A combustion chamber according to claim 1, wherein the means for retaining the studs in the radial direction are constituted by screws passing through the studs with clearance and screwing into the end wall.

6. A combustion chamber according to claim 1, wherein the means for retaining the studs in the radial direction are constituted by a hoop surrounding the tubular structure, at least over the location of the studs.

7. A combustion chamber according to claim 6, wherein the hoop is made by an overwinding of the tubular structure.

8. A combustion chamber according to claim 1, including an internal thermal protection coating for the tubular structure which is bonded thereto and to the gasket bearing member, and an internal thermal protection coating for the end wall, with adjacent ends of the thermal protecting coating of the tubular structure and of the thermal protection coating of the end wall meeting and forming a baffle between the inside volume of the chamber and the sealing gasket.

9. A combustion chamber according to claim 1, wherein the gasket bearing member and the end wall have substantially the same coefficient of thermal expansion.

* * * * *